(12) United States Patent
Chung

(10) Patent No.: US 7,106,551 B2
(45) Date of Patent: Sep. 12, 2006

(54) METHOD AND APPARATUS FOR NOISE REDUCTION DURING SEEKS USING SIGNAL BLENDING

(75) Inventor: Feei Y. Chung, Cupertino, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/011,797

(22) Filed: Dec. 14, 2004

(65) Prior Publication Data

US 2005/0134996 A1 Jun. 23, 2005

Related U.S. Application Data

(60) Provisional application No. 60/530,419, filed on Dec. 17, 2003, provisional application No. 60/530,364, filed on Dec. 17, 2003.

(51) Int. Cl.
  *G11B 5/596* (2006.01)

(52) U.S. Cl. .................................................. 360/78.04
(58) Field of Classification Search .................... None
  See application file for complete search history.

(56) References Cited

U.S. PATENT DOCUMENTS

| | | | | |
|---|---|---|---|---|
| 5,182,684 | A * | 1/1993 | Thomas et al. | 360/78.09 |
| 5,901,009 | A * | 5/1999 | Sri-Jayantha et al. | 360/78.07 |
| 6,115,205 | A * | 9/2000 | Waugh et al. | 360/78.06 |
| 6,704,159 | B1 * | 3/2004 | Ding et al. | 360/78.06 |
| 6,930,853 | B1 * | 8/2005 | Settje et al. | 360/78.04 |
| 2005/0141130 | A1 * | 6/2005 | Tamura et al. | 360/78.06 |

* cited by examiner

*Primary Examiner*—K. Wong
(74) *Attorney, Agent, or Firm*—Fliesler Meyer, LLP

(57) ABSTRACT

The blending of control indicators of a non-linear seek mode control and settle mode is done in a transition period between a non-linear seek mode and settle mode of the arm actuator in a hard disk drive. Such a blended transition avoids acoustical clicking that can occur for short distance seeks.

20 Claims, 4 Drawing Sheets

METHOD AND APPARATUS FOR NOISE REDUCTION DURING SEEKS USING SIGNAL BLENDING

CLAIMS OF PRIORITY

This application claims priority to U.S. Provisional Application No. 60/530,419 entitled "Method for Noise Reduction During Seeks Using Signal Blending", filed Dec. 17, 2003 and U.S. Provisional Application No. 60/530,364 entitled "Apparatus for Noise Reduction During Seeks Using Signal Blending", filed Dec. 17, 2003.

FIELD OF THE INVENTION

The present invention relates to the performance of rotating media storage devices, such as Hard Disk Drives (HDDs), especially to servomechanisms for arm actuators.

BACKGROUND

Rotating media storage devices are an integral part of computers and other devices with needs for large amounts of reliable memory. Rotating media storage devices are inexpensive, relatively easy to manufacture, forgiving where manufacturing flaws are present, and capable of storing large amounts of information in relatively small spaces.

A typical rotating media storage device uses a rotatable storage medium with a head disk assembly and electronics to control operation of the head disk assembly. The head disk assembly can include one or more disks. In a magnetic disk drive, a disk includes a recording surface to receive and store user information. The recording surface can be constructed of a substrate of metal, ceramic, glass or plastic with a thin magnetizable layer on either side of the substrate. Data is transferred to and from the recording surface via a head mounted on an arm of the actuator assembly. Heads can include one or more read and/or write elements, or read/write elements, for reading and/or writing data. Drives can include one or more heads for reading and/or writing. In magnetic disk drives, heads can include a thin film inductive write element and a magneto-resistive (MR) read element.

An actuator, such as a Voice Coil Motor actuator, is used to position the head assembly over the correct track on a disk by rotating the arm. Typically, when the drive needs to move the head to a desired track, if the head is relatively far form that track, it starts out in a non-linear seek mode where the target velocity approximates a square root of the tracks to go (TTG). Once the head gets close to the target track, the drive typically switches over to a settle mode where the target velocity is a linear function of the tracks to go. Finally, once the head gets close enough to the target track for read/write operations, the drive then switches to a track-following mode. Typically, the same linear control law as in the settle mode is used, except with different parameters.

BRIEF SUMMARY

Audible clicks can be a problem with rotating media storage devices, such as hard disk drives. Clicking can occur due to sharp transients in the command current. Such transients can occur during transitions between a non-linear seek mode and a settle mode. The transitions are especially a problem for short seek distances. Embodiments of the present invention blend control indications of the nonlinear seek and the linear settle mode in a transition period so as to produce a blended control signal without sharp transients. Blended control signals avoid the problem of audible clicks.

DETAILED DESCRIPTION

Figure 1:
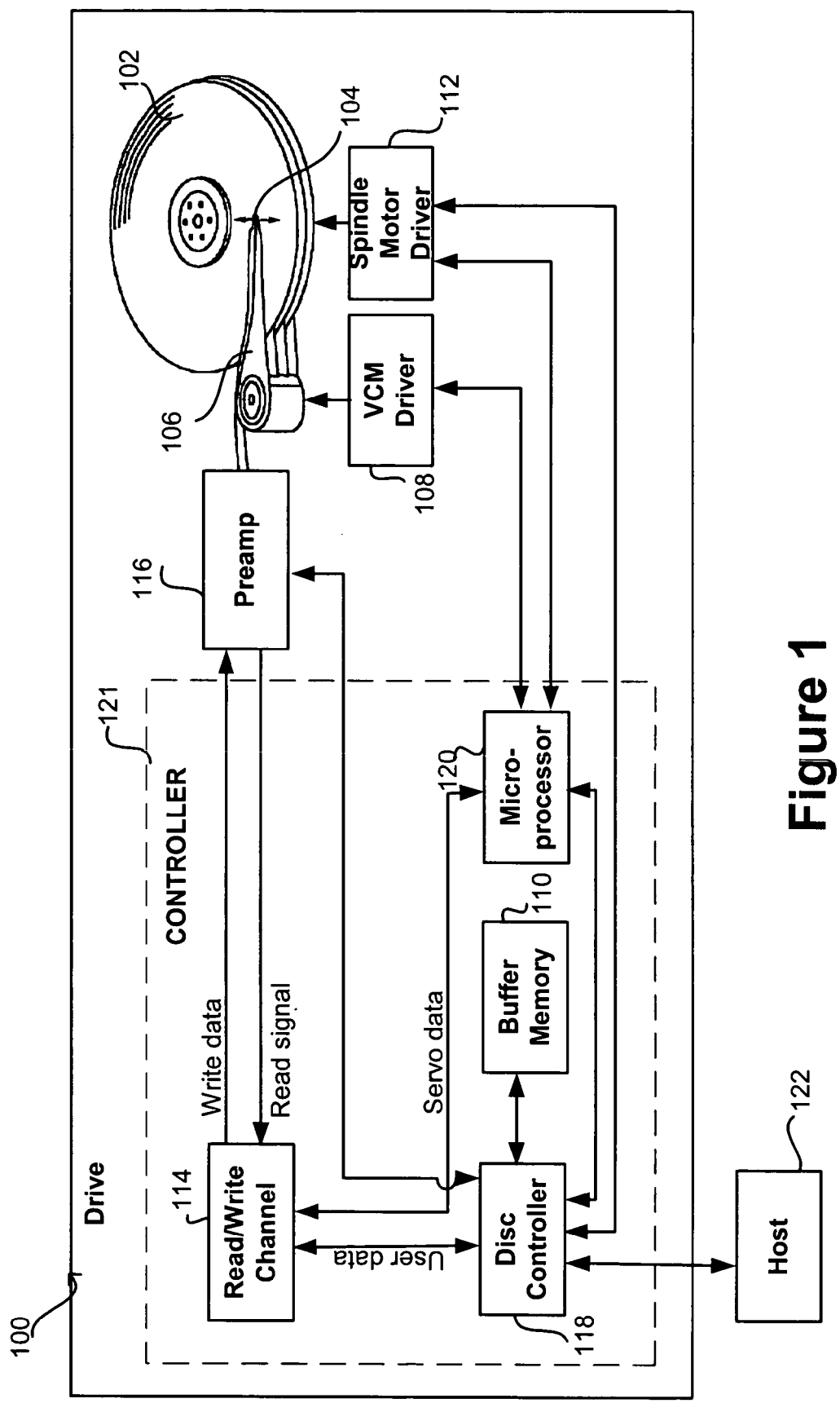
FIG. 1 is a diagram of a rotating media storage device of one embodiment of the present invention.

FIG. 1 shows a rotating media storage device 100 that can be used in accordance with one embodiment of the present invention. In this example, the rotating media storage device 100 is a hard disk drive. The rotating media storage device 100 includes at least one rotatable storage medium 102 capable of storing information on at least one surface. Numbers of disks and surfaces may vary by disk drive. In a magnetic disk drive, the storage medium 102 is a magnetic disk. A closed loop servo system, including an actuator arm 106, can be used to position head 104 over selected tracks of disk 102 for reading or writing, or to move head 104 to a selected track during a seek operation. In one embodiment, head 104 is a magnetic transducer adapted to read data from and write data to the disk 102. In another embodiment, head 104 includes separate read elements, such as magnetoresistive (MR) read heads, and write elements. Multiple head configurations may be used.

The servo system can include a voice coil motor driver 108 to drive a voice coil motor (VCM) for rotating the actuator arm 106. The servo system can also include a spindle motor driver 112 to drive a spindle motor (not shown) for rotation of the disk 102. Controller 121 can be used to control the rotating media storage device 100. The controller 121 can include a number of arrangements. In one embodiment, the controller includes a disk controller 118, read/write channel 114, processor 120, buffer memory on one chip. These elements can also be arranged on multiple chips. The controller can include fewer elements as well.

In one embodiment, the controller 121 is used to control the VCM driver 108 and spindle motor driver 112, to accept information from a host 122 and to control many disk functions. A host can be any device, apparatus, or system capable of utilizing the data storage device, such as a personal computer or Web server. The controller 121 can include an interface controller in some embodiments for communicating with a host and in other embodiments, a separate interface controller can be used. The controller 121 can also include a servo controller, which can exist as circuitry within the drive or as an algorithm resident in the controller 121, or as a combination thereof In other embodiments, an independent servo controller can be used.

Disk controller 118 can provide user data to a read/write channel 114, which can send signals to a current amplifier or pre-amp 116 to be written to the disk(s) 102, and can send servo signals to the microprocessor 120. Controller 121 can also include a memory controller to interface with external memory (not shown).

Figure 2:
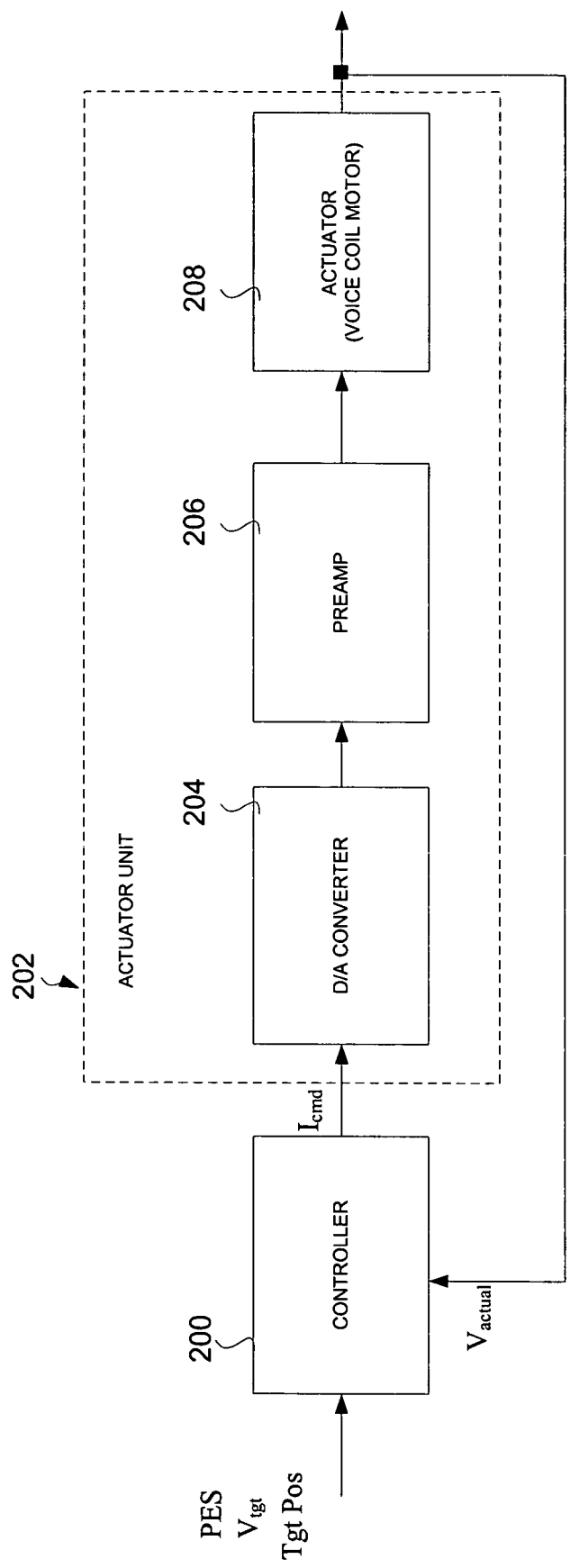
FIG. 2 is a diagram illustrating a controller and actuator unit in one embodiment of the present invention.

FIG. 2 illustrates a controller 200 and actuator unit 202 used in one embodiment of the present invention. The controller 200 uses information such as a Position Error Signal (PES), target velocity and actual velocity to determine a command current to be sent to the actuator unit 202. In this embodiment, the command current is a digital value that is converted by the D/A converter 204 to an analog signal. This analog signal is sent to a pre-amp circuit 206 which amplifies the signal and sends it to the actuator, such as a voice coil motor.

Figure 3:
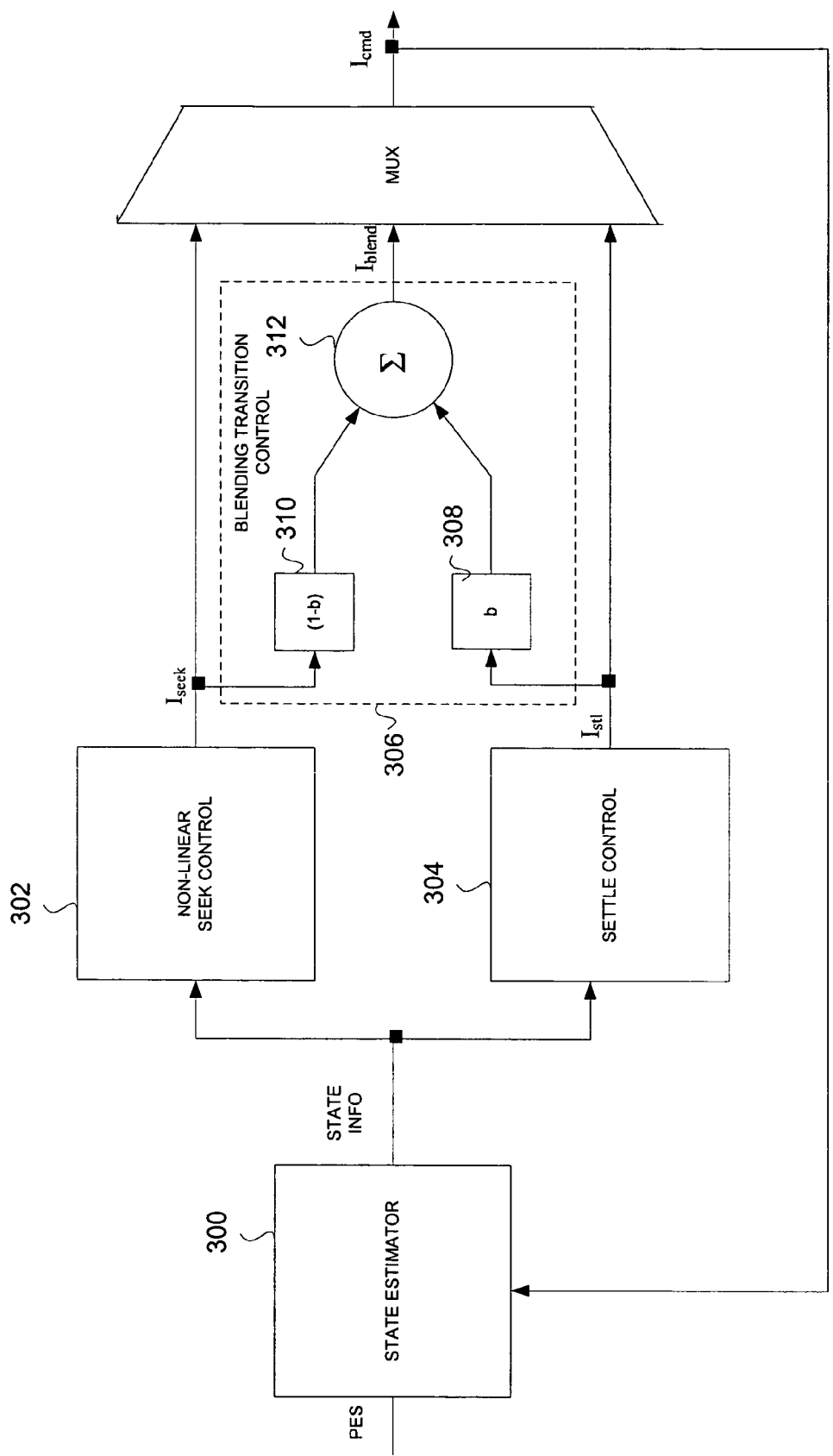
FIG. 3 is a diagram illustrating blending between a non-linear seek and a linear settle control for one embodiment of the present invention.

FIG. 3 is a functional diagram of a portion of an actuator controller. The actuator controller can be implemented in hardware or as software executing on a processor. In the example of FIG. 3, a state estimator 300 is used to estimate the current state of the actuator. State information estimated can include an estimation of the head position, velocity, acceleration and the like. This state estimator produces state information which is used to determine a control signal for the arm actuator. In this embodiment, non-linear seek control unit 302 takes the state information and produces control indications for the non-linear seek mode. The settle control unit 304 produces the control indication for the settle mode. Any settle and non-linear seek control methods can be used.

Control indications for the non-linear seek control and for the settle control are blended during a transition period. In one embodiment, command current for the seek and command current for the settle are blended to form a blended command current. During the blend transition both the non-linear seek and the settle control indications are produced. The blending control element 306 can produce a blended command current. In one embodiment, the settle control indication is multiplied by blending factor b (in block 308); the non-linear seek control indication is multiplied by (1-b) (in block 310). The values from block 308 and 310 are added in block 312 to produce a blended indication. The example of FIG. 3, illustrates the blending of the command current. In another embodiment, the target velocity values for the non-linear seek and the settle mode can be blended to produce a blended target velocity. This blended target velocity can be used to produce a current command.

In one embodiment, the blending factor, b, is a monotonic function of time. In one embodiment, the blending factor goes from 0 at time $t_0$, to 1 at time $t_0+P$. In one embodiment, the blending factor is linear from time $t_0$ to time $t_0+P$. Other blending factors other than linear ones can be used. The linear version is easy to implement and thus may be preferable.

Figure 4A:
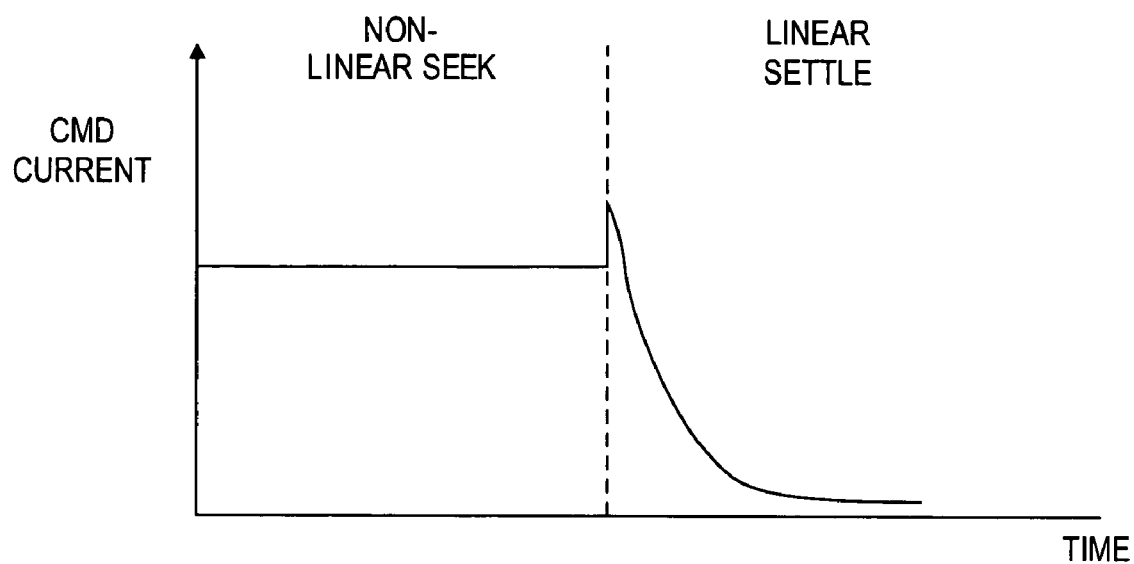
FIG. 4A illustrates the transition between the command current for the transition between the non-linear seek and the linear settle without the blend of transition.
Figure 4B:
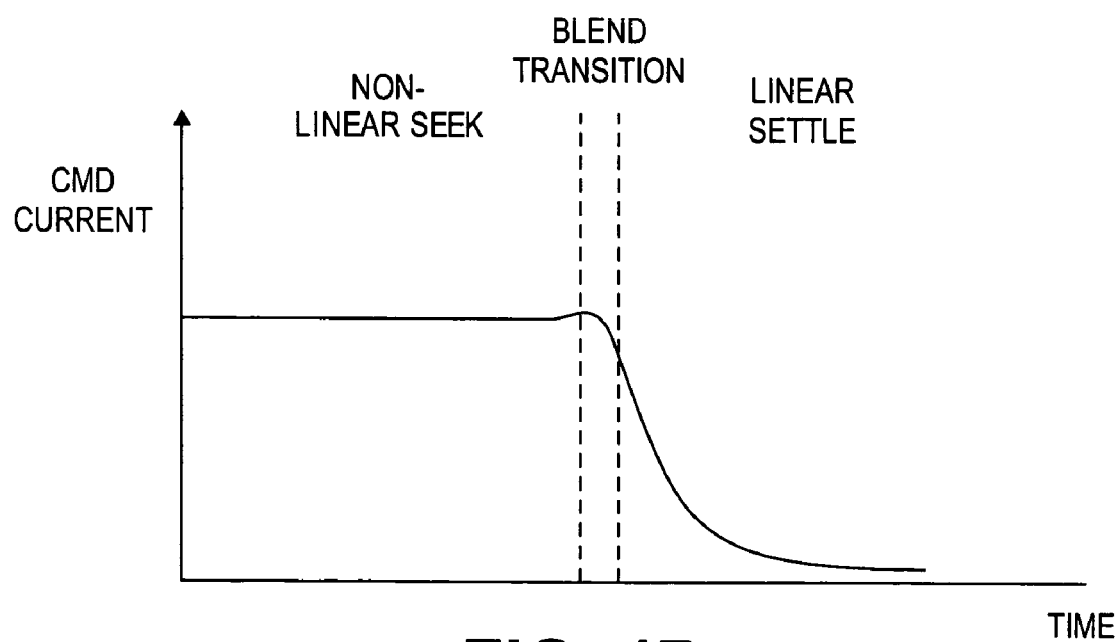
FIG. 4B illustrates a transition between the non-linear seek and linear settle including the blend transition.

FIG. 4A shows an illustrative graph of command current versus time. In this embodiment, since there is a discontinuity between the command unit in the non-linear seek and linear settle modes, acoustical clicking can occur at the transition. In FIG. 4B, a blend transition period is used between a non-linear seek and a linear settle mode. In this way, discontinuities and the resulting acoustic clicking are avoided. The acoustical clicking maybe a larger problem for short seek distances. For relatively large seek distances the head can ramp up to a maximum velocity and the trajectory of the head will follow similar curves down to the linear region. For shorter track distances the maximum velocity is not reached and the trajectory of the head can vary significantly which can make it difficult to tune the parameters of the non-linear seek and the settle mode to match so there is no discontinuity in the command current at the transition. The blend transition between the modes makes it easier to select parameters for the non-linear seek and settle modes and avoid acoustical clicking. The period of the transition can be a fixed value such as a few sample periods or can be a variable value, such as a period that depends upon the velocity of the head.

In one embodiment, the settle mode uses a linear control law. In one embodiment the settle mode is used for small PES signals where the head is close to the correct track. The non-linear seek mode and settle mode can be defined by a Proximate-Time Optimal Servo (PTOS) based control technique.

In one embodiment, in a seek controller, target velocity is calculated based on Tracks to Go (TTG) using desired approximately (square-root) trajectory, and current command is:

$$I_{seek}=K_{2s}(V_{tgt}-\hat{x}_2)-\hat{x}_3+\text{Seek }FF+\text{bias}$$

In a linear-velocity controller, target velocity is a linear function of the Position Error Signal (PES):

$$V_{tgt}=K_{1l}/K_{2l}(x_{1\ meas}-\hat{x}_1)$$

and the current command is:

$$I_{stl}=K_{2l}(V_{tgt}-\hat{x}_2)-\hat{x}_3+\text{bias}$$

Two exemplary combinations of the control indications are described below:

1.) Mix/blend target velocity:

$$V_{tgt}=V_{tgt\_seek}*(1-b)+V_{tgt\_LV}*(b). \text{ Where b is the blending factor.}$$

2.) Mix/blend current command:

$$\begin{aligned}I_{cmd} &= I_{seek}*(1-b)+I_{stl}*(b)\\ &= [K_{2s}(V_{tgt}-\hat{x}_2)-\hat{x}_3+seekFF+bias+\ldots]*(1-b)+\\ &\quad [K_{2l}(V_{tgt}-\hat{x}_2)-\hat{x}_3+bias+\ldots]*(b)\\ &= [K_{2s}*(1-b)+K_{2l}*(b)](V_{tgt}-\hat{x}_2)-\hat{x}_3+\\ &\quad bias\ldots+seekFF*(1-b)\end{aligned}$$

blending current command is simply blending $K_2$ and seek FF.

where $K_{2s}$=controller gain applied to velocity error during seek mode
$\hat{x}_1$=estimated position
$\hat{x}_2$=estimated velocity
$\hat{x}_3$=estimated unknown bias current
seekFF=feed-forward current applied during seek
bias=known bias current
$K_{1l}$=controller gain applied to position error during settle mode
$K_{2l}$=controller gain applied to velocity error during settle mode
x1meas=measured position
$V_{tgt}$=target velocity
$V_{tgt-seek}$=target velocity as computed by the non-linear controller
$V_{tgt-LV}$=target velocity as computed by the linear controller
$I_{cmd}$=controller output current
$I_{seek}$=controller output current as computed by the non-linear controller
$I_{stl}$=controller output current as computed by the linear controller A number of blending factors, b, can be used. The simplest version is a linear blending where the blending function $$f_{ab-blend} = f_a * \left(1 - \frac{t}{p}\right) + f_b\left(\frac{t}{p}\right),$$

where p is the length of the blending period.

at t=0, $f_{ab-blend}=f_a$.
at t=P, $f_{ab-blend}=f_b$.
The blending factor, b, is simply $$\frac{t}{p}.$$

Other Blending functions can also be used with b(t=0)=0 and b(t=p)=1.

$$e.g.\ b = 1 - 1/2\left[1 + \sin\left(t + \frac{p}{2}\right) * \frac{\pi}{p}\right]$$

$$= 1 - 1/2\left[1 + \operatorname{Sin}\left(\left(\frac{t}{p} + 1/2\right)\pi\right)\right]$$

or, alternatively, $$f_{ab-blend} = f_a * (1/2 + f_{ab-factor}) + f_b(1/2 - f_{ab-factor}),$$

where $f_{ab-factor} = 1/2\ \sin\left[\left(\frac{t}{p} + 1/2\right)\pi\right]$

The foregoing description of preferred embodiments of the present invention has been provided for the purpose of illustration and description. It is not intended to be exhaustive or to limit the invention to the precise forms disclosed. Many modifications and variations will be apparent to one of the ordinary skill in the relevant arts. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalence.

What is claimed is:

1. A method of calculating a control signal for an arm actuator of a rotating media storage device:
   in a non-linear seek mode, determining non-linear seek mode control indications to produce a control signal for an arm actuator;
   in a settle mode, determining settle mode control indications to produce the control signal for arm actuator; and
   during a transition between the non-linear seek mode and settle mode, blending the non-linear seek mode control indications and the settle mode control indications to produce the control signal for the arm actuator.

2. The method of claim 1, wherein the non-linear seek mode control indications and settle mode control indications are current commands.

3. The method of claim 2, wherein the non-linear seek mode and settle mode current commands are used to produce a blended current command during the transition.

4. The method of claim 1, wherein the non-linear seek mode control indications and settle mode control indications are target velocities.

5. The method of claim 4, wherein the non-linear seek mode and settle mode target velocities are used to produce a blended target velocity which is used to determine a command current.

6. The method of claim 1, wherein the blending uses a blending factor, b.

7. The method of claim 6, wherein a blended control indication is produced equal to a non-linear seek mode control indication multiplied by (1-b) plus a settle mode control indication multiplied by b.

8. The method of claim 6, wherein the blending factor is a monotonic function of time.

9. The method of claim 6 wherein the blending factor goes from 0 at time $t_0$ to 1 at time $t_0+P$.

10. The method of claim 9, wherein the blending factor is linear from time $t_0$ to time $t_0+P$.

11. The method of claim 1, wherein the settle mode uses a linear control law.

12. The method of claim 1, wherein the settle mode is used for a small position error signal.

13. An apparatus comprising:
    a rotating media storage device arm actuator unit; and
    a controller to produce control signals for the arm actuator unit, the controller, in a non-linear seek mode, determining non-linear seek mode control indications to produce the control signal for the arm actuator, the controller, in a settle mode, determining settle mode control indications to produce the control signal for arm actuator and, the controller, during a transition between the non-linear seek mode and settle mode, blending the non-linear seek mode control indications and the settle mode control indications to produce the control signal for the arm actuator.

14. The apparatus of claim 13, wherein the non-linear seek mode control indications and settle mode control indications are current commands.

15. The apparatus of claim 14, wherein the non-linear seek mode and settle mode current commands are used to produce a blended current command during the transition.

16. The apparatus of claim 13, wherein the non-linear seek mode control indications and settle mode control indications are target velocities.

17. The apparatus of claim 16, wherein the non-linear seek mode and settle mode target velocities are used to produce a blended target velocity which is used to determine a command current.

18. The apparatus of claim 13, wherein the blending uses a blending factor, b.

19. The apparatus of claim 18, wherein a blended control indication is produced equal to a non-linear seek mode control indication multiplied by (1-b) plus a settle mode control indication multiplied by b.

20. The apparatus of claim 18, wherein the blending factor is a monotonic function of time.

* * * * *